(12) United States Patent
Sturdivant et al.

(10) Patent No.: US 6,446,812 B1
(45) Date of Patent: Sep. 10, 2002

(54) REMOVAL OF ELEMENTAL PHOSPHORUS FROM MIXTURES WITH OTHER SOLIDS

(75) Inventors: Charles N. Sturdivant, Nashville, TN (US); George Walter Luxbacher, Lexington, KY (US); Mohan Singh Saran, Grand Island, NY (US); Kenneth Raburn Price, Nicholasville, KY (US)

(73) Assignee: Glenn Springs Holdings, Inc., Lexington, KY (US)

( * ) Notice: Subject to any disclaimer, the term of this patent is extended or adjusted under 35 U.S.C. 154(b) by 0 days.

(21) Appl. No.: 09/443,589

(22) Filed: Nov. 19, 1999

(51) Int. Cl.[7] .................................................. B07B 1/46
(52) U.S. Cl. ............................. 209/238; 209/7; 209/11; 209/270; 209/280
(58) Field of Search ............................. 209/3, 4, 7, 11, 209/238, 270, 274, 279, 280

(56) References Cited

U.S. PATENT DOCUMENTS 3,193,273 A * 7/1965 Miller et al. ............ 209/238 X
3,909,291 A * 9/1975 Leong .................... 209/270 X
4,492,627 A   1/1985 Crea ........................... 209/3
4,538,767 A * 9/1985 Pimley .................... 209/270 X
4,585,354 A * 4/1986 Thesenfitz .............. 209/238 X

FOREIGN PATENT DOCUMENTS

JP          54-7670    *  1/1979    ................. 209/238

* cited by examiner

Primary Examiner—Tuan N. Nguyen
(74) Attorney, Agent, or Firm—Richard D. Fuerle

(57) ABSTRACT

Disclosed is a separator for separating a meltable solid from a mixture with other solids. The separator has a tank for holding a fluid; a container at least partially inside the tank, made at least in part of a screen through which the fluid can pass and melted solids can flow, but through which the unmelted solid material will not flow; and a heater for heating the fluid above the melting point of the meltable solids. Also disclosed is a method of separating a meltable solid from a mixture with other solids. The mixture of solids is placed in the container of the separator and the fluid is heated to a temperature above the melting point of the meltable solid, whereby the meltable solid flows through the screen out of the container, while the other solids remain within the container.

18 Claims, 1 Drawing Sheet

REMOVAL OF ELEMENTAL PHOSPHORUS FROM MIXTURES WITH OTHER SOLIDS

BACKGROUND OF THE INVENTION

This invention relates to an apparatus and a method for separating a solid that can be melted from a mixture with other solids. In particular, it relates to the separation of elemental phosphorus from phosphorus bearing sludges by melting the phosphorus in the sludge inside a screened container.

In processing phosphate rock to obtain phosphorus for use in making fertilizers, detergents, and other products, vast quantities of unuseable sludge is also produced. Since this sludge contains elemental phosphorus, it must be stored in ponds to prevent the spontaneous ignition of the phosphorus in air. Maintaining the ponds is costly, creates legal and environmental problems, and is a loss of valuable phosphorus.

The phosphorus in the ponds can be recovered using mobile sumps—large, open-bottomed tubes. The sumps are forced down into the pond sediment and steam is sparged into the sediment inside the sump, melting the phosphorus. The sediment is pumped out of the sump and the melted phosphorus is separated from the remaining solids by gravity settling and filtration.

SUMMARY OF THE INVENTION

We have discovered an apparatus and method of separating elemental phosphorus and other meltable solids from mixtures with other solids. In our invention, the mixture is placed inside a screen and is heated until the meltable solid melts; the melted solid flows through the screen and is collected, while the other solids remain inside the screen. The apparatus of this invention is more energy efficient than a mobile sump, can handle larger solids, and provides a better separation of phosphorus from other solids.

BRIEF DESCRIPTION OF THE DRAWINGS

The accompanying drawing is a side view showing a certain preferred embodiment of an apparatus according to this invention.

DESCRIPTION OF THE PREFERRED EMBODIMENTS

Figure 1:
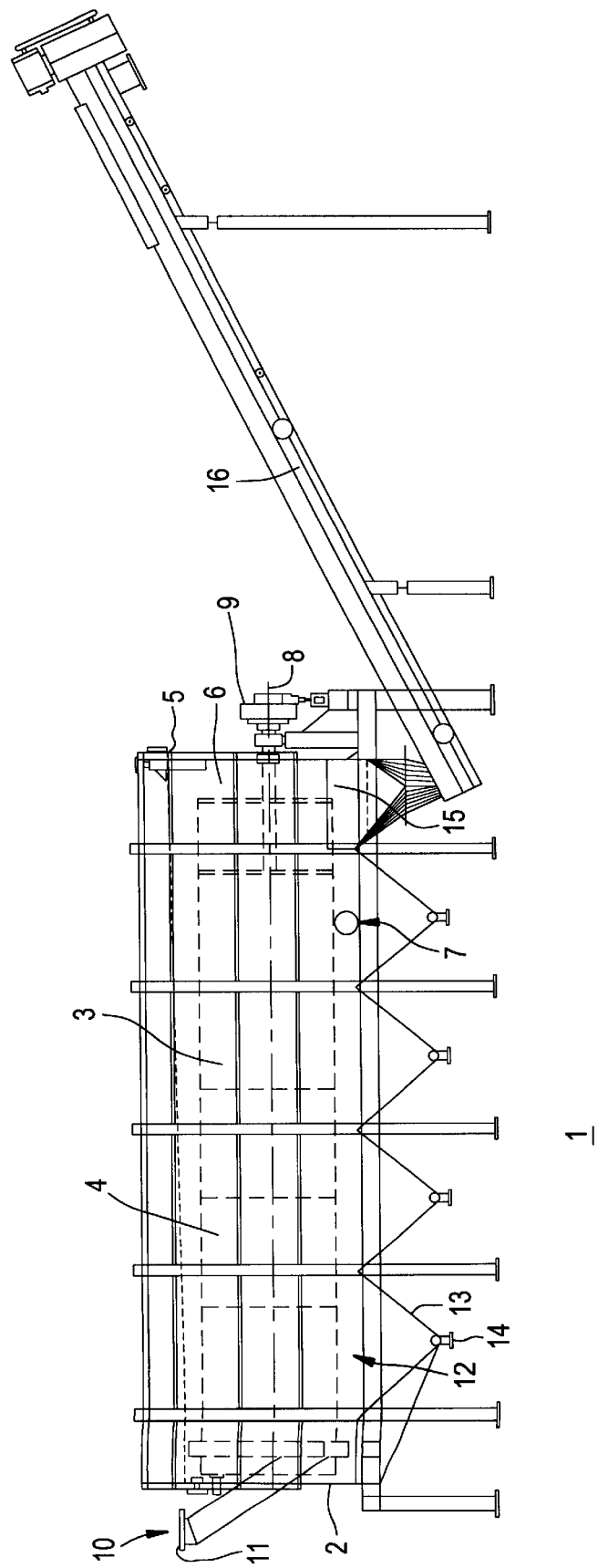

In the drawing, a separator 1 according to this invention has a tank 2 in which is placed a horizontal cylindrical container 3 having a screened portion 4. Tank 2 is filled to level 5 with a liquid 6, such as water, which can be heated by means of heater 7. The axis 8 of container 3 is at an adjustable angle $\alpha$ to the horizontal. Container 3 can be rotated about its axis 8 by means 9, such as an electric, hydraulic, or air motor, or engine. Sludge, sediment, or other mixtures of solids 10 can be admitted to the inside of container 3 through input 11. (An annular solid ring, not shown, over that end of container 3 prevents material from spilling out.) Melted solids 12 flow through the openings in screened portion 4 of container 3 and collect in cones 13, which can be opened using valves 14. Unmelted solids 15 gradually tumble down container 3 and are removed by means of dewatering screw conveyer 16.

This invention can be used to treat any mixture of solids that contains at least one solid that melts at a lower temperature than the other solids from which it is to be separated (or the other solids may not melt). Examples of such mixtures include elemental phosphorus in phosphorus sludge and hydrocarbons in petrochemical sludge. The mixture preferably contains elemental phosphorus and various high melting or infusible solids. For example, the phosphorus can be in a mixture with dirt, furnace slag, rock, sand, clay, and debris. Water is usually also present to keep the phosphorus from spontaneously igniting. A typical mixture from the production of elemental phosphorus from phosphate rock contains about 1 to about 40 wt % elemental phosphorus.

The screened container can have any shape suitable for holding unmelted solids while permitting melted solids to escape. A cylindrical shape is preferred as a cylinder is self-cleaning, but other shapes, such as that of a cone or a rotated ellipse or parabola, can also be used. The cylinder can be made of many flat panels for better mixing and easier repair. If a cylinder is used, its axis is preferably at an angle a of between about 0 and about 5 degrees to the horizontal, so that solids move down the cylinder as it rotates. Alternatively, the cylinder can be fitted with screw flights, which will move material along the cylinder as it is rotated. The cylinder can have any dimensions, but a cylinder about 2 to about 8 feet (about 0.6 to about 2.4 m) in diameter and about 10 to about 40 feet (about 3.7 to about 12 m) long is practical for many materials. The container can be made of a variety of materials, including aluminum and various plastics; steel is the preferred material due to its strength and durability.

At least some portion of the container is screened (where the melted solid is to flow out) but other portions can be unscreened to provide mechanical support or for other reasons. The openings in the screened portion should be large enough that they do not plug frequently but small enough to minimize the size of the solid particles that pass through and must be handled by the downstream equipment. A practical range for many types of materials is about 0.06 to about 0.25 inches (about 0.2 to about 0.6 cm). The openings in the screened portion can become larger or smaller along the length of the cylinder so that the distribution of the melted phosphorus and inert solids to the various cones is controlled.

The container is preferably rotated or otherwise agitated to aid in separating the melted solids from the unmelted solids. To minimize splashing, wear, and vibration, the container is preferably rotated at less than 10 rpm. It can also be vibrated, but this is generally not necessary. The container is at least partially immersed in the liquid in the tank; the portion not immersed can be in an inert atmosphere to prevent the spontaneous ignition of the phosphorus.

The mixture is heated to a temperature above the melting point of the meltable solid or solids that are to be separated, but below the melting point of any solids or solids that are not to be separated. If the meltable solid is elemental phosphorus, for example, the mixture should be heated to about 50° C. as elemental phosphorus melts at 44.1° C. Heating is most conveniently accomplished by placing the screened container in a bath of a hot fluid. While the fluid can be an inert gas, such as carbon dioxide or nitrogen, it is preferably a liquid, such as water or an organic solvent, e.g., methanol, or toluene. If phosphorus is the meltable solid, the liquid is preferably water as it is inexpensive, non-toxic, and easy to work with. If a heavy liquid such as brine is used, the phosphorus will float out of the container instead of sinking to the bottom.

The mixture can be added to the screened container either in batches or continuously, but continuous addition and removal of the meltable solid is preferred as processing is easier, more efficient, and more economical. It is also possible to heat the mixture in one step, melting the meltable solid, then place the mixture into the screened container for separation in a separate step, but this is not preferred.

We claim:

1. A separator for separating elemental phosphorus from sludge containing other solids comprising
   (A) a tank holding an air-excluding fluid;
   (B) a container having a substantially horizontal axis and an input port at one end and an exit port at the other, where said container is
      (1) within said tank beneath the level of said fluid; and
      (2) made at least in part of a screen;
   (C) means for rotating said container about its axis;
   (D) means for axially moving said sludge inside said container beneath the level of said fluid; and
   (E) means for heating said sludge above the melting point of said elemental phosphorus.

2. A separator according to claim 1 wherein said container has a diameter of about 2 to about 8 feet and a length of about 10 to about 40 feet.

3. A separator according to claim 1 wherein the openings in said screen are about 0.06 to about 0.25 inches.

4. A separator according to claim 1 wherein said means for rotating said container about its axis is an electric, hydraulic, or air motor or an engine.

5. A separator according to claim 1 wherein said means for rotating said container about its axis rotates said container at less than 10 rpm.

6. A separator according to claim 1 wherein said means for axially moving said sludge is mounting said container with its axis at an angle to the horizontal.

7. A separator according to claim 1 wherein said means for axially moving said sludge is screw flights inside said container.

8. A separator according to claim 1 wherein said tank has more than one exit port for removing melted elemental phosphorus.

9. A separator according to claim 8 wherein the openings in said screen are larger at one end than at the other end.

10. A method of separating elemental phosphorus from sludge containing other solids using a separator according to claim 1 comprising
    (A) adding said air-excluding fluid to said tank;
    (B) placing said sludge in said container;
    (C) rotating said container; and
    (D) heating said fluid to a temperature above the melting point of elemental phosphorus in said sludge, whereby said elemental phosphorus melts and flows through said screen out of said container.

11. A method according to claim 10 wherein said sludge is moved along said container by mounting the axis of said container at an angle to the horizontal.

12. A method according to claim 10 wherein said sludge is moved along said container by screw flights inside said container.

13. A method according to claim 10 wherein melted elemental phosphorus exits said tank from more than one port.

14. A method according to claim 13 wherein the openings in said screen are smaller at one end than at the other end.

15. A separator for separating elemental phosphorus from a mixture with other solids comprising
    (A) a tank holding a liquid;
    (B) a cylinder which is
       (1) completely immersed in said liquid;
       (2) made at least in part of a screen through which elemental phosphorus can flow, but through which unmelted solids larger than about 0.25 inches cannot pass; and
       (3) mounted with its axis at an angle to the horizontal, where said angle is less than about 5 degrees;
    (C) means for rotating said cylinder about its axis; and
    (D) a heater for heating said liquid to a temperature above the melting point of elemental phosphorus in said mixture.

16. A method of separating elemental phosphorus from a mixture with other solids comprising
    (A) admitting said mixture in the higher end of the cylinder of a separator according to claim 15;
    (B) rotating said cylinder at less than 10 rpm; and
    (C) heating said liquid to a temperature above the melting point of elemental phosphorus in said mixture, whereby said elemental phosphorus melts and flows through said screen out of said cylinder.

17. A separator for separating elemental phosphorus from sludge containing other solids comprising
    (A) a tank holding water;
    (B) a cylinder which is
       (1) completely immersed in said water;
       (2) made at least in part of a screen having openings therethrough of about 0.06 to about 0.25 inches;
       (3) mounted with its axis at an angle to the horizontal, where said angle is less than about 5 degrees;
    (C) an electric motor for rotating said cylinder about its axis at less than about 10 rpm; and
    (D) a heater for heating water in said tank to a temperature that will melt elemental phosphorus, but below the melting point of other solids in said sludge.

18. A method of separating elemental phosphorus from phosphorus sludge comprising
    (A) continuously admitting said phosphorus sludge to the higher end of a cylinder in a separator according to claim 17;
    (B) rotating said cylinder at less than 10 rpm; and
    (C) heating water in said tank to a temperature above 44.1° C., whereby melted elemental phosphorus flows through said screen out of said cylinder while unmelted solids do not pass through said screen.

* * * * *